(12) United States Patent
Kim et al.

(10) Patent No.: US 10,389,002 B2
(45) Date of Patent: Aug. 20, 2019

(54) ELECTRODE DRYING DEVICE, AND BATTERY CELL COMPRISING ELECTRODE MANUFACTURED ACCORDING TO SAME

(71) Applicant: LG CHEM, LTD., Seoul (KR)

(72) Inventors: Young-Jin Kim, Daejeon (KR); Hyuk-Su Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 28 days.

(21) Appl. No.: 15/571,343

(22) PCT Filed: Sep. 29, 2016

(86) PCT No.: PCT/KR2016/010935
§ 371 (c)(1),
(2) Date: Nov. 2, 2017

(87) PCT Pub. No.: WO2017/086592
PCT Pub. Date: May 26, 2017

(65) Prior Publication Data
US 2018/0226700 A1 Aug. 9, 2018

(30) Foreign Application Priority Data
Nov. 20, 2015 (KR) .................. 10-2015-0163441

(51) Int. Cl.
| | | |
|---|---|---|
| *H01M 10/653* | (2014.01) | |
| *H01M 4/04* | (2006.01) | |
| *H01M 4/139* | (2010.01) | |
| *F26B 3/18* | (2006.01) | |
| *H01M 4/64* | (2006.01) | |
| *F26B 3/20* | (2006.01) | |
| *F26B 5/04* | (2006.01) | |
| *H01M 10/052* | (2010.01) | |

(52) U.S. Cl.
CPC ............ *H01M 10/653* (2015.04); *F26B 3/18* (2013.01); *F26B 3/20* (2013.01); *F26B 5/04* (2013.01); *H01M 4/04* (2013.01); *H01M 4/139* (2013.01); *H01M 4/64* (2013.01); *H01M 10/052* (2013.01)

(58) Field of Classification Search
None
See application file for complete search history.

(56) References Cited

U.S. PATENT DOCUMENTS

2012/0167409 A1  7/2012  Fujiwara
2016/0216031 A1  7/2016  Fujiwara et al.

FOREIGN PATENT DOCUMENTS

| JP | 2011-208810 A | 10/2011 |
| JP | 2012-069358 A | 4/2012 |
| KR | 10-2012-0040737 A | 4/2012 |

(Continued)

OTHER PUBLICATIONS

International Search Report for PCT/KR2016/010935 (PCT/ISA/210) dated Jan. 31, 2017.

(Continued)

*Primary Examiner* — Wojciech Haske
(74) *Attorney, Agent, or Firm* — Birch, Stewart, Kolasch & Birch, LLP

(57) ABSTRACT

Disclosed is an electrode drying device, which includes a drying chamber configured to accommodate a roll-shaped electrode, and a drying unit provided in the drying chamber to dry the electrode, the drying unit being configured to surround the electrode.

7 Claims, 4 Drawing Sheets

(56) References Cited

FOREIGN PATENT DOCUMENTS

| KR | 10-2013-0136685 A | 12/2013 |
| KR | 10-2014-0054840 A | 5/2014 |
| WO | WO 2015/053198 A1 | 4/2015 |

OTHER PUBLICATIONS

MTI Corporation: "1200° C. Max Sliding Tube Furnace (80mm OD) with Flanges for Fast Heating/Cooling-OTF-1200X-82SL", Dec. 6, 2014, XP055449625, Retrieved from the Internet: URL:http://web.archive.org/web/20141206031923/http://www.mtixtl.com/1200CSlidingTubeFurnace-OTF-1200X-80SL.aspx.

ELECTRODE DRYING DEVICE, AND BATTERY CELL COMPRISING ELECTRODE MANUFACTURED ACCORDING TO SAME

TECHNICAL FIELD

The present disclosure relates to an electrode drying device and a battery cell comprising an electrode manufactured according to the same.

The present application claims priority to Korean Patent Application No. 10-2015-0163441 filed on Nov. 20, 2015 in the Republic of Korea, the disclosures of which are incorporated herein by reference.

BACKGROUND ART

A secondary battery, which is easily applied to various product groups and has electrical characteristics such as high energy density, is universally applied not only for a portable device but also for an electric vehicle (EV) or a hybrid electric vehicles (HEV), an energy storage system or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

A battery cell serving as the secondary battery, in particular, a battery cell serving as a lithium secondary battery, generally includes an electrode assembly composed of a positive electrode containing a lithium transition metal oxide as an electrode active material, a negative electrode containing a carbon-based active material, and a separator, into which a lithium electrolyte is impregnated.

The electrode of the battery cell is fabricated by coating an electrode foil with electrode slurry. The electrode slurry is prepared by mixing an electrode mixture composed of an electrode active material, a conductive material and a binder for bonding these materials to an electrode foil in an organic solvent. Here, the positive electrode active material mainly employs lithium cobalt oxide, lithium manganese oxide, lithium nickel oxide and lithium composite oxide, and carbonaceous material is mainly used as the negative electrode active material.

In addition, the electrode of the battery cell is generally formed by dispersing an active material, a conductive material and a binder in a solvent to prepare slurry, and then applying the slurry directly to the current collector, or applying the slurry to an upper portion of a separate support and then laminating a film peeled off from the support onto the current collector. After that, the electrode is rolled into a roll shape, and then residual solvent and residual moisture are removed by means of an electrode drying device.

A conventional electrode drying device generally includes a drying chamber in a vacuum atmosphere and a heat source for supplying dry hot air from the outside of the rolled-shaped electrode rolled in the drying chamber.

However, in the conventional electrode drying device, a temperature difference is generated between the outside of the roll-shaped electrode, which is dried by indirect dry hot air, and the inside of the electrode. Accordingly, in the conventional electrode drying device, it is difficult to secure the drying uniformity between the outside of the electrode and the inside of the electrode, and thus residual solvent and residual moisture are not efficiently removed at the inside of the electrode. In particular, in the case of a negative electrode, a spring back phenomenon causing the swelling of the electrode appears. The spring back phenomenon may lower the energy density of the battery cell or cause stability problems later.

Therefore, it is required to search for a method of increasing the drying efficiency of the electrode so as to solve the above problems of the electrode drying device.

DISCLOSURE

Technical Problem

The present disclosure is directed to providing an electrode drying device which may increase the electrode drying efficiency, and a battery cell comprising an electrode manufactured using the electrode drying device.

Technical Solution

In one aspect of the present disclosure, there is provided an electrode drying device, comprising: a drying chamber configured to accommodate a roll-shaped electrode; and a drying unit provided in the drying chamber to dry the electrode, the drying unit being configured to surround the electrode.

The drying unit may include: a heat source for giving heat to dry the electrode; and a clamping part for supplying the heat provided from the heat source to the electrode, the clamping part being configured to surround an outer surface of the electrode.

An inner surface of the clamping part may be in direct contact with the outer surface of the electrode.

The clamping part may press the electrode to prevent heat loss of the electrode.

A heat wire may be provided at an inner surface of the clamping part.

The clamping part may be made of thermally conductive material.

The clamping part may be made of stainless steel.

The clamping part may include: a first clamping member configured to surround a portion of the outer surface of the electrode; and a second clamping member pivotally mounted to the first clamping member to surround the other portion of outer surface of the electrode.

The drying chamber may have a vacuum atmosphere therein.

In another aspect of the present disclosure, there is provided a battery cell, comprising an electrode manufactured using the electrode drying device according to the above embodiments.

Advantageous Effects

According to various embodiments as described above, it is possible to provide an electrode drying device capable of increasing the electrode drying efficiency and a battery cell comprising an electrode manufactured using the electrode drying device.

Accordingly, it is possible to provide an electrode drying device capable of preventing the spring back phenomenon of the electrode and a battery cell comprising an electrode manufactured using the electrode drying device.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
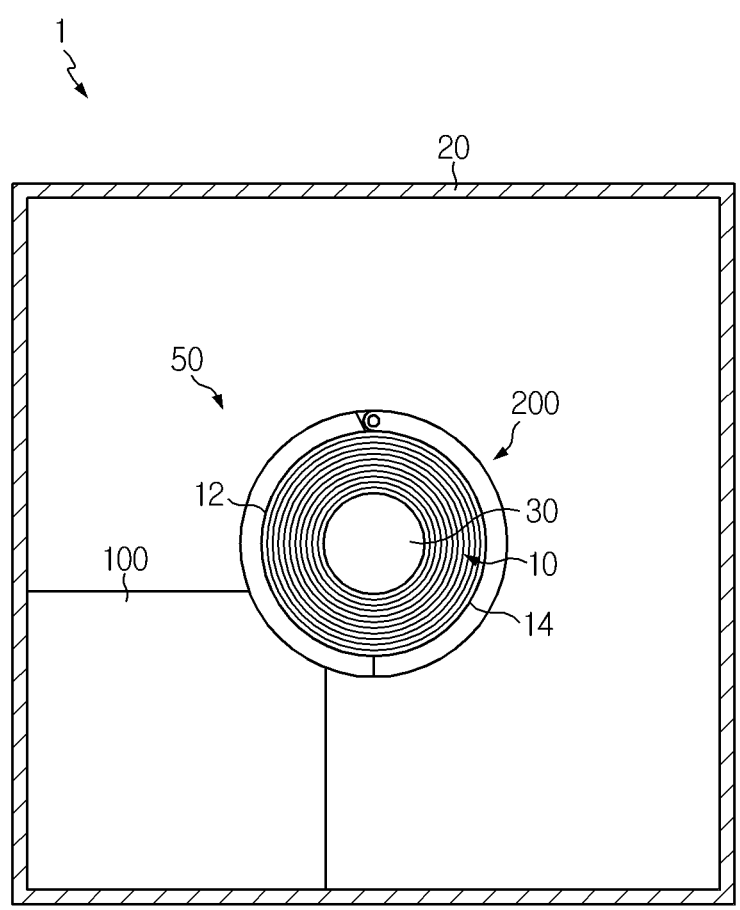
FIG. 1 is a diagram for illustrating an electrode drying device according to an embodiment of the present disclosure.
Figure 2:
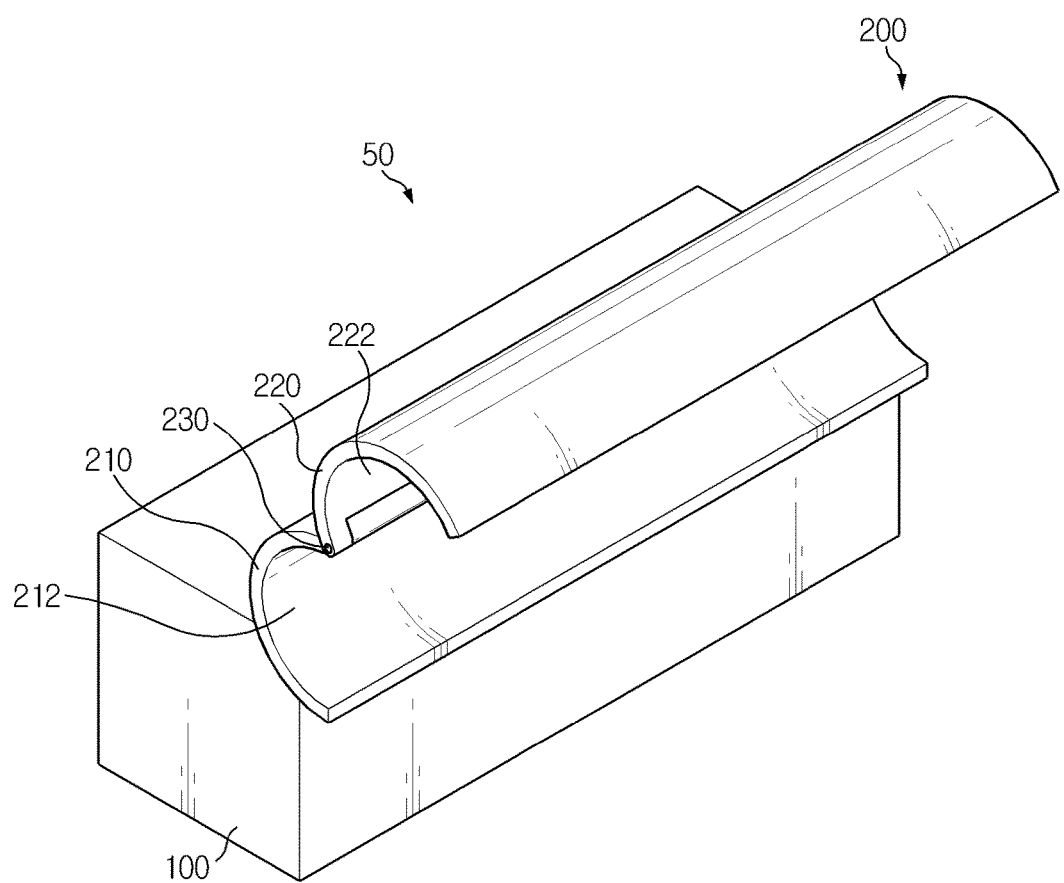
FIG. 2 is a diagram for illustrating a drying unit of the electrode drying device depicted in FIG. 1.

FIG. 1 is a diagram for illustrating an electrode drying device according to an embodiment of the present disclosure, and FIG. 2 is a diagram for illustrating a drying unit of the electrode drying device depicted in FIG. 1.

Referring to FIGS. 1 and 2, an electrode drying device 1 is a device for drying an electrode 10 of a battery cell and may include a drying chamber 20, an electrode roller 30 and a drying unit 50.

The electrode 10 is generally formed by dispersing an active material, a conductive material and a binder in a solvent to prepare slurry, and then applying the slurry directly to a current collector, or applying the slurry to an upper portion of a separate support and then laminating a film peeled off from the support onto the a current collector. The electrode 10 may be provided in the drying chamber 20, explained later, in a roll shape in order to remove residual solvent and residual moisture.

The drying chamber 20 may accommodate the roll-shaped electrode 10, the electrode roller 30, explained later, the drying unit 50, and various facilities of the electrode drying device 1. The drying chamber 20 may have a vacuum atmosphere therein to prevent an electrode mixture or the like applied to the electrode 10 from being oxidized.

The electrode roller 30 is used for winding or unwinding the electrode 10 and may roll the electrode 10 into a roll shape. Moreover, the electrode roller 30 may support the electrode 10.

The drying unit 50 is used for drying the electrode 10 and is provided in the drying chamber 20. The drying unit 50 may surround the electrode 10. The drying unit 50 may include a heat source 100 and a clamping part 200.

The heat source 100 may give heat to dry the electrode 10. Here, the heat source 100 may be configured with various kinds of heat sources which may provide heat to dry the electrode 10.

The clamping part 200 is used for supplying the heat provided from the heat source 100 to the electrode 10 and may be provided at one side of the heat source 100. The clamping part 200 may be made of a thermally conductive material with high thermal conductivity to achieve effective heat transfer to the electrode 10. For example, the clamping part 200 may be made of stainless steel with high thermal conductivity and high corrosion resistance.

The clamping part 200 may completely surround an outer surface 12, 14 of the electrode 10. Here, an inner surface 212, 222 of the clamping part 200 may be in direct contact with the outer surface 12, 14 of the electrode 10.

Moreover, the inner surface 212, 222 of the clamping part 200 may have a heat wire for more effective heat transfer. Accordingly, the clamping part 200 may more effectively transfer the heat supplied from the heat source 100 to the electrode 10.

In addition, the clamping part 200 may surround the outer surface 12, 14 of the electrode 10 while pressing the electrode 10 in order to prevent heat loss of the electrode 10. Accordingly, the clamping part 200 may seal the electrode 10 to prevent leakage of the heat supplied to the electrode 10.

The clamping part 200 may include a first clamping member 210, a second clamping member 220, and a connection hinge 230.

The first clamping member 210 surrounds a portion 12 of the outer surface of the electrode 10 and may press the portion 12 of the outer surface of the electrode 10. Here, the inner surface 212 of the first clamping member 210 is in contact with the portion 12 of the outer surface of the electrode 10 and may have a heat wire.

The second clamping member 220 surrounds the other portion 14 of the outer surface of the electrode 10 and may press the other portion 14 of the outer surface of the electrode 10. Here, the inner surface 222 of the second clamping member 220 is in contact with the other portion 14 of the outer surface of the electrode 10 and may have a heat wire. The second clamping member 220 may be pivotally mounted to the first clamping member 210.

The connection hinge 230 may connect the first clamping member 210 and the second clamping member 220 and guide the pivotal movement of the second clamping member 220.

Hereinafter, the operations of the electrode drying device 1 configured as above will be described in detail.

Figure 3:
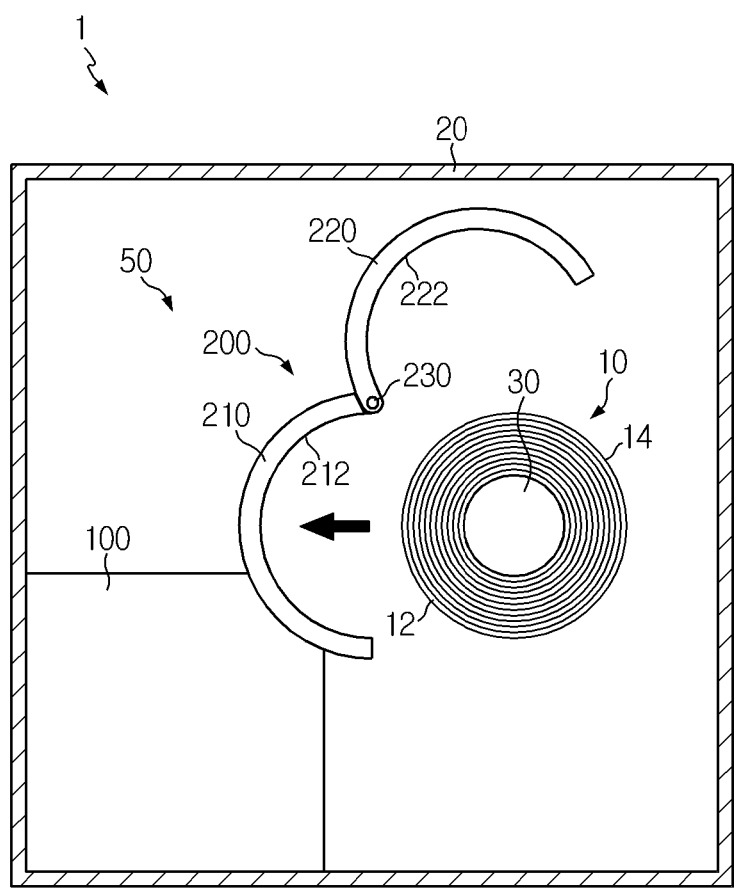
FIGS. 3 and 4 are diagrams for illustrating operations of the electrode drying device depicted in FIG. 1.
Figure 4:
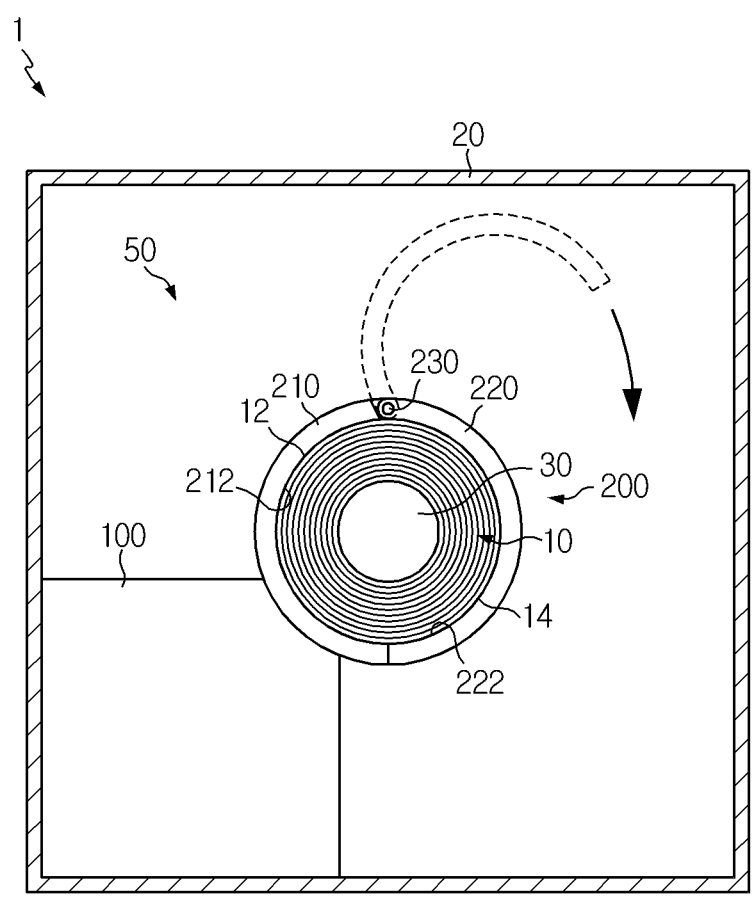

FIGS. 3 and 4 are diagrams for illustrating operations of the electrode drying device depicted in FIG. 1.

Referring to FIGS. 3 and 4, first, in the electrode drying device 1, the drying unit 50 in the drying chamber 20 may place the electrode roller 30 supporting the rolled-shaped electrode 10 by using the clamping part 200. At this time, the drying unit 50 may open the clamping part 200 by pivoting the second clamping member 220 so that the electrode 10 and the electrode roller 30 may be placed in the clamping part 200.

If the electrode 10 and the electrode roller 30 are placed, the drying unit 50 may pivot the second clamping member 220 to position the electrode 10 and the electrode roller 30 inside the clamping part 200. At this time, the portion 12 of the outer surface of the electrode 10 may be pressed in contact with the inner surface 212 of the first clamping member 210, and the other portion 14 of the outer surface of the electrode 10 may be pressed in contact with the inner surface 222 of the second clamping member 220.

Accordingly, the electrode 10 may be sealed in the clamping part 200 while being completely surrounded by the first clamping member 210 and the second clamping member 220.

After that, the heat source 100 of the drying unit 50 may give heat to the clamping part 200, and the clamping part 200 may transfer the heat provided from the heat source 100 to the electrode 10.

In this embodiment, the clamping part 200 with high thermal conductivity is in direct contact with the electrode 10 while completely surrounding the electrode 10, and thus the heat may be more effectively transferred to the inside of the electrode 10, compared to the case where the electrode 10 is dried by indirect hot air.

Accordingly, in the electrode drying device 1 of this embodiment, drying uniformity is ensured between the outside and the inside of the electrode 10, and thus residual solvent and residual moisture may be effectively removed even at the inside of the electrode.

Thus, the electrode drying device 1 of this embodiment may greatly improve the drying efficiency of the electrode 10.

Accordingly, residual solvent and residual moisture may be almost completely removed from the electrode manufactured using the electrode drying device 1. Thus, a battery cell comprising an electrode manufactured using the drying device 1 may prevent the spring back phenomenon of the electrode in advance, thereby ensuring higher energy density and higher safety.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. An electrode drying device, comprising:
   a drying chamber configured to accommodate a roll-shaped electrode; and
   a drying unit provided in the drying chamber to dry the electrode, the drying unit being configured to surround the electrode;
   the drying unit includes:
   a heat source for giving heat to dry the electrode; and
   a clamping part for supplying the heat provided from the heat source to the electrode, the clamping part being configured to surround an outer surface of the electrode,
   wherein an inner surface of the clamping part is in direct contact with the outer surface of the electrode.

2. The electrode drying device according to claim 1, wherein the clamping part presses the electrode to prevent heat loss of the electrode.

3. The electrode drying device according to claim 2, wherein a heat wire is provided at an inner surface of the clamping part.

4. The electrode drying device according to claim 2, wherein the clamping part is made of thermally conductive material.

5. The electrode drying device according to claim 4, wherein the clamping part is made of stainless steel.

6. The electrode drying device according to claim 2, wherein the clamping part includes:
   a first clamping member configured to surround a portion of the outer surface of the electrode; and
   a second clamping member pivotally mounted to the first clamping member to surround the other portion of outer surface of the electrode.

7. The electrode drying device according to claim 2, wherein the drying chamber has a vacuum atmosphere therein.

* * * * *